INVENTOR.
Rosser L. Wilson,
BY Wallace & Cannon,
Attorneys

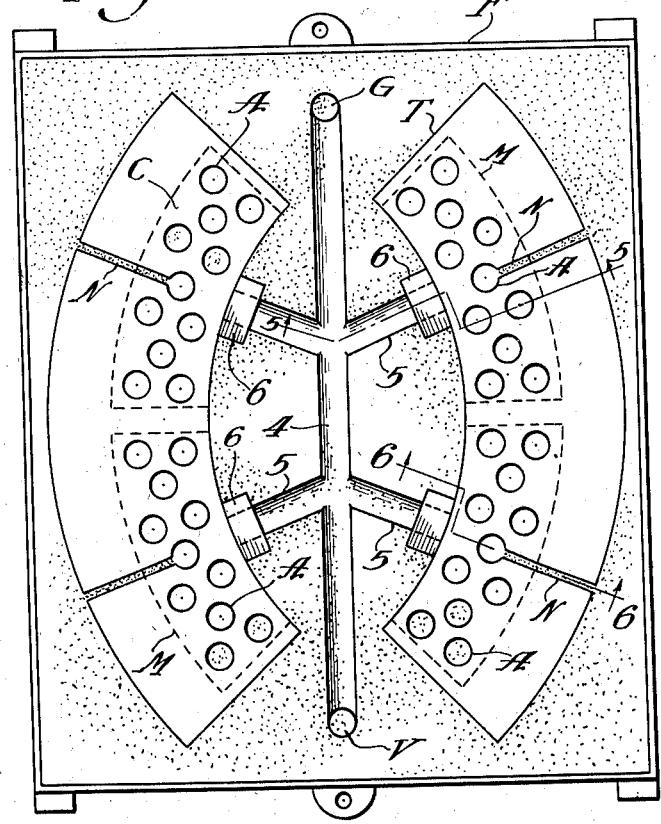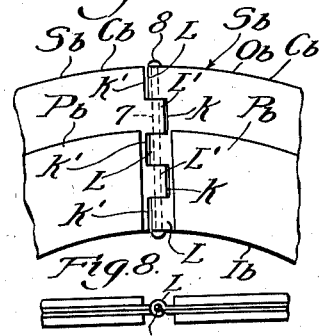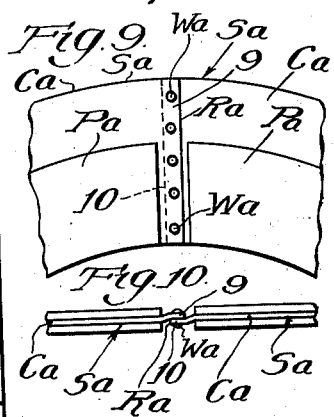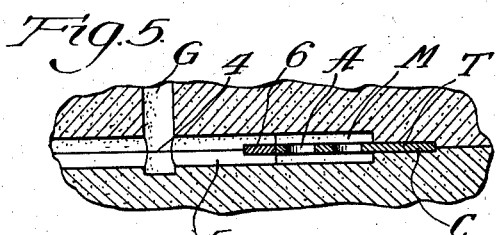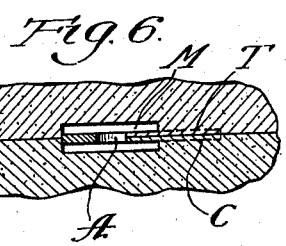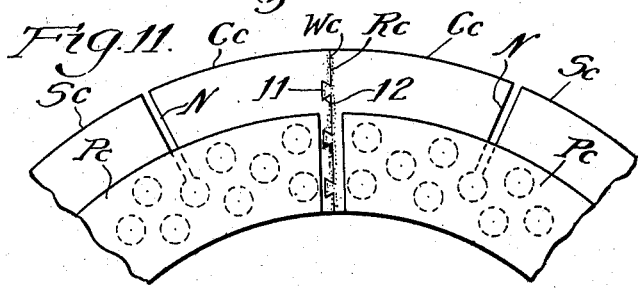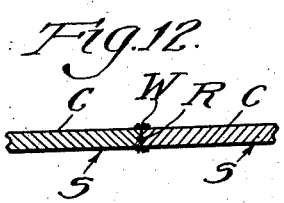

Patented July 14, 1942

2,289,689

UNITED STATES PATENT OFFICE 2,289,689

METHOD OF CASTING BRAKING ELEMENTS

Rosser L. Wilson, Mahwah, N. J., assignor to The American Brake Shoe and Foundry Company, Wilmington, Del., a corporation of Delaware Application October 19, 1940, Serial No. 361,873

4 Claims. (Cl. 22—203)

This invention relates to braking elements and to the method of making the same.

Braking devices, consisting of alternately arranged stationary and rotatable disc-like members, used on railway equipment and the like are so arranged that adjacent of the disc-like members may be brought into engagement one with the other to thereby effect deceleration. In such devices it has been found advantageous to provide the respective interengageable disc-like members with working surfaces embodying proper braking properties with respect to the working surface on the member to be engaged thereby, and to this end it has been proposed heretofore to form alternate of the disc-like members from suitable steel plates and to provide the member or members adapted for cooperation therewith with a cast iron working surface or surfaces, for it has been found that desirable braking properties accrue upon the interengagement of surfaces afforded by such materials.

Certain of the disc-like members or braking elements included in braking arrangements of the aforesaid character consist of a flat steel ring having cast iron pads cast on opposite faces near the inner periphery thereof, the steel ring affording the carrier or support and the cast iron pads affording the working surfaces of the complete braking element. Rings of this character are relatively expensive and difficulty is usually encountered in casting the cast iron pads or working faces thereon, for in the casting operations the rings may warp or otherwise distort and thereby prevent uniform or other proper casting of the pads thereon and such distortion has otherwise rendered the rings useless. This has in the past increased the cost of braking elements of the aforesaid character because of the relatively high foundry discount which accrued in such instances. Furthermore, the steel rings were produced from blank plates and since the rings are of an appreciable diameter, rather substantial quantities of material, particularly from the center of the plates from which the rings were produced, were waste.

The foregoing and kindred difficulties may be overcome by fabricating a braking element of the aforesaid character from a plurality of sections and hence, among the objects of this invention is to suitably join together a plurality of properly constituted and arranged sections that may be satisfactorily and economically produced, and thereby afford an efficient and relatively inexpensive braking element of the aforesaid character.

Another object is to fabricate the carrier or support portion of a braking element of the aforesaid character from a plurality of sections, each of which may be produced from a blank of a size closely approximating the desired size of the section so as to thereby reduce the waste attendant to the production of such sections, and consequently the carrier or support portion, to a minimum.

Still another object is to form a braking element of the aforesaid character from sections each embodying a carrier of such a nature that the cast iron facings may be so cast thereon that warping or other distorting of the carrier in the casting operation will be reduced to a minimum and uniform and proper casting of cast iron pads or working surfaces thereon will be assured so as to thereby avoid objectionable foundry discount and the like.

Other objects are to form a braking element of the aforesaid character by joining together a plurality of suitably constituted and arranged sections as by welding or otherwise positively uniting adjacent edges of the sections; to insure against undue distortion, in the course of use of braking elements of the aforesaid character, such as might be induced by heating of the elements in use, by producing slots therein in such a manner and in such locations that such distortion will be prevented while at the same time the required strength of the elements will not be impaired; and to maintain slots of the aforesaid character free of the cast iron and thereby enable expansion and contraction of an element including such slots without undue distortion when the element is in service.

Yet other objects of the invention are to enable cast iron facings to be cast on carriers of sections, that are to be welded or to otherwise be joined to afford a braking element of the aforesaid character, in such a way as to avoid warping or other distortion of the carriers in the casting operations; to prevent burning or like injury to the carrier during the casting operation; to unite facings cast on opposite faces of a carrier of the aforesaid character by providing openings in the carrier through which the molten metal may flow in the casting operation and thereby unite the facings provided on opposite faces of the carrier; and to so cast the facings on opposite faces of the carrier that the facings will be confined to and united with those portions of the carrier on which they are to be mounted in such a way that the molten metal, in the course of the casting operation, will be prevented from flowing into slots or like formations in the carrier that should be free of such metal in order to insure proper operation of a braking element formed from such sections each embodying such a carrier.

Other and further objects of the present invention will be apparent from the following description and claims and will be understood by reference to the accompanying drawings which, by way of illustration, show preferred embodiments and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings,

Fig. 4 is a plan view of the drag of a flask used in casting the sections of a braking element, such as that to which this invention pertains, and shows the parts arranged in the drag in position preparatory to a casting operation;

Figure 1:
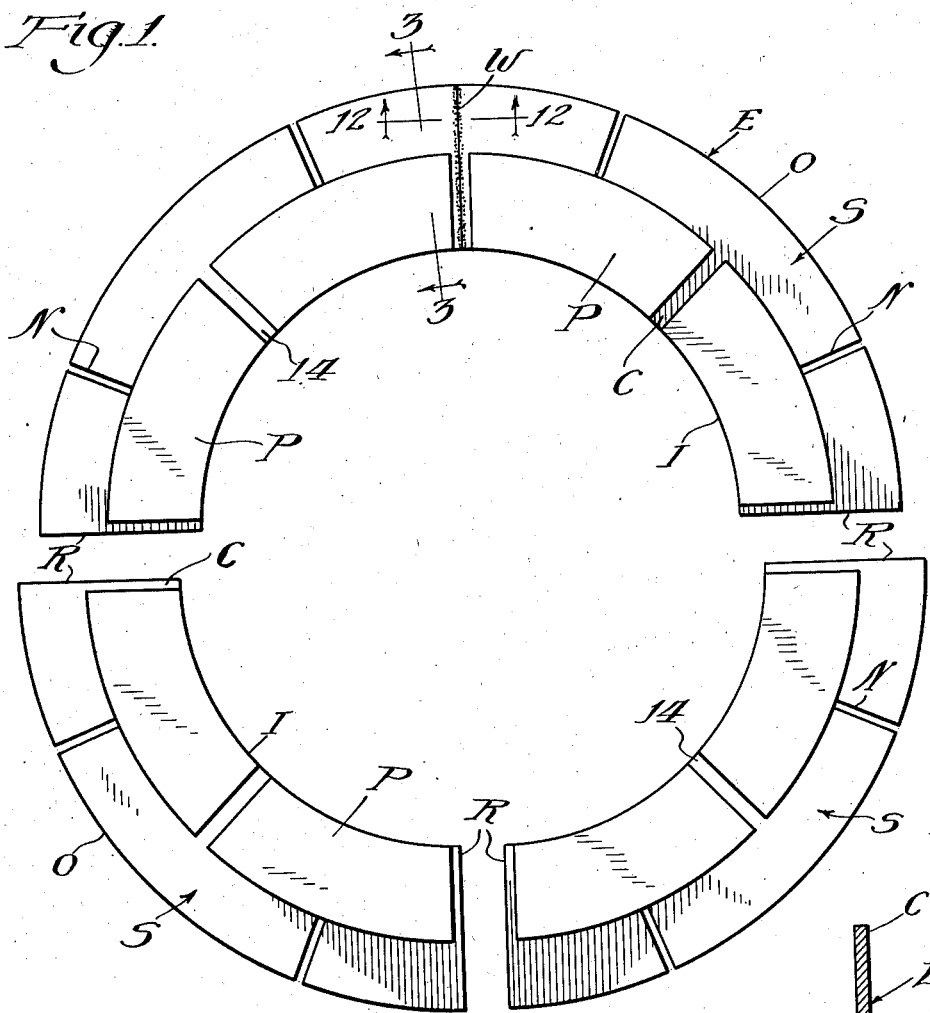
Fig. 1 is an elevational view of a sectional braking element of the character to which this invention pertains and in which two of the sections thereof are shown united as is done to afford the finished element and in which the other sections are shown arranged in position to be brought into final position and thereafter united.

Figs. 5 and 6 are sectional detail views of the flask with the parts arranged in position preparatory to a casting operation, these views being taken respectively and substantially on the lines 5—5 and 6—6 on Fig. 4;

Fig. 7 is a fragmentary view, similar to the upper portion of Fig. 1, but showing a modified form of the invention;

Fig. 8 is an edge elevation looking in at the bottom of Fig. 7;

Fig. 9 is a fragmentary view, similar to Fig. 7, but showing another modified form of the invention;

Fig. 10 is an edge elevation looking in at the bottom of Fig. 9;

Fig. 11 is still another view, similar to Fig. 7, but showing a further modified form of the invention; and Fig. 12 is a sectional detail view taken substantially on the line 12—12 on Fig. 1.

In the form of the invention illustrated in Figs. 1, 2, 3 and 12, I have shown a disc-like braking element generally indicated by E that consists, in the present embodiment, of a plurality of sections S which, when joined together in a manner to be explained presently, afford a continuous ring-like member. Each section S includes a support portion or carrier C that is preferably stamped from a steel plate of a size closely approximating that of the carrier so as to thereby reduce the waste attendant to the stamping of such a carrier from such a steel plate to a minimum, the plate being of a thickness equal to that desired in the carrier.

In the present instance the carrier or support portion C of each section S includes an outer periphery O and an inner periphery I which preferably lie on arcs struck from the same center and the ends R of such a carrier lie on radii passing through such center. Moreover, in the illustrated form of the carrier, the edges R lie on radii spaced ninety degrees apart for this arrangement enables an element as E to be made up from four sections S each embodying such a carrier. It will be understood, however, that a greater or less number of sections might be utilized without departing from the purview of my invention and in such instance the edges R of the carriers C will be spaced one from the other in such a way that when a plurality of sections are joined together a complete ring will be afforded.

Figure 2:
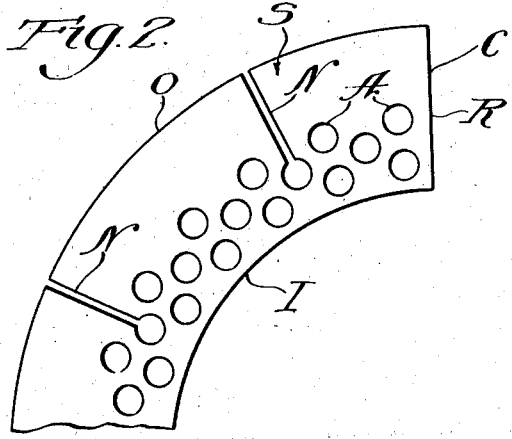
Fig. 2 is a fragmentary elevational view of one of the carriers of the sections utilized in the braking element shown in Fig. 1.
Figure 3:
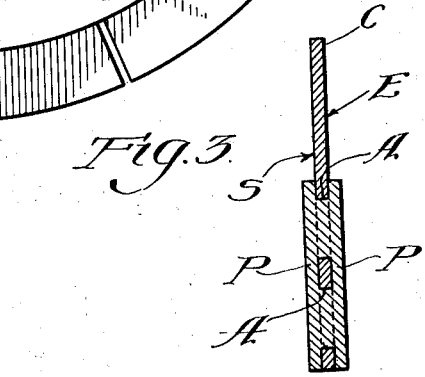
Fig. 3 is a transverse sectional detail view taken substantially on the line 3—3 on Fig. 1.

In the course of stamping a carrier C from a steel plate, as aforesaid, a plurality of openings A are formed therein in staggered relation one with the other and such openings are confined to that portion of the carrier adjacent the inner periphery I thereof. Slots or notches N are formed simultaneously with the openings A and extend into the carrier at spaced intervals from the outer periphery O thereof to that portion of the carrier whereat the openings A are formed, and desirably the slots N may terminate in selected of the openings A as shown in Fig. 2. The slots or notches N serve to prevent detrimental distortion of the carrier C in an element E when the element is in service, the slots N being exposed in the finished element E, as can be ascertained by reference to Fig. 1.

Braking or working faces are afforded on each carrier C by pads P of cast iron which are cast on the carrier to extend inwardly from the inner curved periphery thereof, and these pads are preferably confined to that portion of the carrier whereat the openings A are located. As can best be ascertained by reference to Fig. 3, the pads P are provided on opposite faces of each carrier; the pads on such opposite faces are preferably aligned one with the other and desirably being of equal thickness.

The sections S, each comprising a support portion or carrier C of the aforesaid character and each having, in the present instance, two sets of pads P on opposite faces thereof, are preferably united one with the other to afford an element E by having edges R of two sections abutted one against the other and thereafter the sections are welded together along such abutting edges, as indicated at W, Figs. 1 and 12.

While in some instances it is advantageous that the sections as S be joined one to the other by butt welding as at W, in other instances it may be advantageous to afford sections as Sa, Figs. 9 and 10, embodying carriers as Ca, including pads as Pa, and to provide mating stepped end portions along the radial edges Ra of the carrier Ca. Thus by referring to Figs. 9 and 10, it will be seen that the marginal portion 9 along the radial edge Ra of one section Ca is offset upwardly from the plane of the carrier Ca, while the marginal portion 10 along the radial edge Ra of an adjoining carrier Ca is offset downwardly from the plane of such carrier Ca, it being understood that the marginal portion along the other edge Ra of the carrier Ca, including the marginal portion 9, is offset similarly to the marginal portion 10, while the marginal portion along the other marginal edge Ra of the carrier Ca, including the marginal portion 10, is offset upwardly corresponding to the marginal portion 9. The marginal portions 9 and 10 are so offset that when an upwardly offset portion as 9 is arranged over a downwardly offset portion as 10, the main extent of the carrier portions Ca on which such marginal portions are formed lie in the same plane. After marginal portions as 9 and 10 have been overlapped, the carriers Ca on which they are formed and consequently the sections Sa of which such carriers Ca are a part are united one with the other by spot welding the overlapped portions together, as indicated at Wa. It will be appreciated that in some instances it will be desirable to resort to overlapping of the marginal portions in the manner shown, for example, in Figs. 9 and 10 and to thereafter spot-weld together such overlapped portions rather than to resort to the butt welding as at W, Figs. 1 and 12. Furthermore, when overlapped portions as 9 and 10 are provided, rivets may be employed in place of the spot welds Wa to unite the carriers Ca.

While the carrier portions of a section of an element as E may either be joined by butt welding or by having adjacent marginal portions overlapped and thereafter spot-welded or riveted together, as explained, there are instances where it will be advantageous to afford a mechanical interconnection between the carrier portions of such sections, and one manner in which this can be accomplished is illustrated in Figs. 7 and 8. Thus, as shown in Figs. 7 and 8, each section as Sb includes a carrier Cb that has pads Pb corresponding to the cast iron pads P cast thereon. In this arrangement the radial edge of one carrier Cb has lugs L formed thereon adjacent the outer periphery Ob and the inner periphery Ib, and notches K are formed inwardly of the lugs L to extend inwardly from the radial edge to thereby define an intermediate lug L. As best shown in Fig. 8, the lugs as L are rolled upon themselves to define an opening 7 therein.

Along the radial edge of the carrier Cb adapted to be joined to the radial edge on another carrier formed in the manner just described notches K' are formed adjacent the outer periphery Ob and the inner periphery Ib of the carrier as well as a medially located notch K', the notches K' being adapted to receive the lugs L on the adjacent carrier. Furthermore, lugs L', similar to the lugs L, are formed along the radial edge intermediate the notches K' so as to thereby be aligned with the notches K, these lugs L' being rolled to afford an opening 7. It will be understood that the radial edge of a carrier opposite a radial edge including notches as K' and lugs as L' will be formed similarly to the radial edge including the lugs L and the notches K and that the radial edge of a carrier opposite that including the radial edge equipped with lugs as L and notches as K will be equipped with notches as K' and lugs as L' so as to thereby enable the lugs and notches on adjacent edges of the carriers Cb to be interfitted. When lugs as L are disposed in notches as K' and lugs as L' are disposed in notches as K and the openings 7 in the various lugs are aligned, a pintle 8 is passed through the openings 7 and the ends of this pintle are peened over, and in this way a hinged interconnection between adjacent sections as Cb is afforded and the sections are mechanically united.

In some instances it may be desirable to resort to both a mechanical and a welded interconnection and one arrangement to which resort may be had to accomplish this is shown in Fig. 11, and by referring thereto it will be seen that the radial edge Rc of one carrier Cc of a section Sc has keystone-shaped lugs 11 formed thereon, while the radial edge Rc of an adjacent carrier Cc has complementary keystone-shaped notches 12 formed therein. It will be understood that the carriers as Cc have cast iron pads Pc, corresponding to the pads P, cast thereon and that other than the arrangement along the radial edges as Rc the sections Sc correspond to the sections S. It will also be understood that the radial edge of a carrier Cc opposite that equipped with lugs as 11 will have notches as 12 formed therein and that the radial edge of a carrier opposite that having notches as 12 formed therein will be equipped with lugs as 11 so as to thereby enable the mechanical interconnection of adjacent edges of sections that are to be united.

Resort may be advantageously had to lugs 11 which, of course, may be of any desired shape and also to notches as 12 to receive such lugs, which notches will, of course, be shaped complementarily to the lugs, for the reason that the interfitting of the lugs in the notches assures accurate alignment of the carriers Cc that are to be united. Once lugs as 11 have been disposed in notches as 12, the adjoining edges as Rc may thereafter be butt welded as at Wc, and in this way the accurately aligned carriers as Cc are firmly united one with the other.

It will be understood that while I have illustrated and described a variety of ways in which carriers as C of sections as S may have the radial edges as R thereof interconnected, resort may be had to other equivalent arrangements without departing from the purview of my invention, it only being essential that a positive interconnection be afforded between adjacent carriers as C along the radial edges as R thereof.

One of the marked advantages of the present invention is the fact that pads as P may be accurately cast on carriers as C without objectionable distortion of the carriers and in such a way as to avoid objectionable foundry discount. An advantageous way in which this may be effected is illustrated in Figs. 4, 5 and 6 and by referring thereto it will be seen that an ordinary flask F is provided which, in a conventional way, is filled with foundry sand, a suitable pattern (not shown) being included in the drag and cope portions of the flask to define mold cavities as M adapted to receive molten metal and thereby form the pads as P on the carrier as C.

The pattern which is employed is preferably so formed that a recess as T will be formed in the cope and drag portions of the mold and, as best shown in Figs. 5 and 6, the carrier C that is to have pads as P cast thereon is rested in the recesses as T, the carrier C being laid in the recess T formed in the drag portion of the mold and thereafter when the cope portion is placed on the drag portion, the carrier C will extend into the recess T formed in the cope portion, as shown in Figs. 5 and 6.

A gate is formed in the mold and leads to a runner 4 which terminates in a vent V at the end thereof opposite the gate G. Branch runners 5 lead from the main runner 4 to the mold cavities M.

As can best be ascertained by reference to Fig. 5, a branch runner as 5 leads to the inner periphery I of a carrier C and in view of this, molten iron introduced through the gate G and flowing into the main runner 4 and the branch runner 5 could normally flow into contact with the narrow inner periphery I of the carrier C. This might result in burning of this edge of the carrier and to prevent this blocks 6 of refractory material are mounted in alignment with the carrier C and are butted against that portion of the inner periphery I of the carrier C exposed to a branch runner 5, these blocks being rested in suitably formed recesses in the adjacent faces of the cope and drag portions of the mold. Furthermore, it has been explained that the notches or slots as N advantageously terminate in openings as A, and it has also been explained that the notches as N are advantageously kept free of cast iron during the casting operation. To this end, when a carrier as C is rested in a recess as T, molding sand is packed into the notches as N or, if desired, refractory blocks may be disposed in these notches, for so to do prevents molten iron introduced through the gate G and flowing from the main runner 4 through the branches as 5 from flowing into and filling those parts of the notches N exposed in and extending from the mold cavities M.

When molten iron is introduced in through the gate G, it flows through the main runner 4 and out through the branch runners 5 and over the block 6 onto the opposite faces of that portion of the carrier C exposed in the mold cavities M, and the iron flows through the openings as A so that as the iron fills the mold cavities as M on opposite sides of a carrier as C, to form the pads as P, such pads on opposite faces of the carrier are united by the iron that flows through the openings as A. Inasmuch as iron flows over the refractory block 6 and onto the faces of the carrier as C, the iron contacts relatively large portions of the carriers, and this prevents burning of the carriers in the casting operation. Moreover, because the carriers are firmly supported in the mold afforded by the flask F and since the iron is uniformly flowed thereonto in the casting operation, distortion of the carriers and consequent foundry discount such as might arise from burning of the carriers or uneven casting of the pads on the carriers in the event of distortion of the carriers is avoided.

It will be apparent from the foregoing description that I have provided a novel sectional braking element wherein the sections are so united that, in effect, a unitary element is afforded. It will also be appreciated that this element is of simple and economical construction and that it otherwise enables the objects of this invention to be realized. It is to be understood, however, that while I have illustrated and described selected embodiments of my invention, these are capable of variation and modification and I therefore do not wish to be limited to the precise details set forth but desire to avail myself of such changes and alterations as fall within the purview of the following claims:

I claim:

1. The method of casting a working face on the carrier of a section of a sectional braking element which comprises forming a mold cavity in a mold in such a way that the part of said carrier on which such a facing is not to be cast may be engaged by adjacent portions of the mold, mounting the carrier in the mold with aforesaid part thereof engaged by said adjacent portions of the mold to thereby support and disclose the part of the carrier on which the facing is to be cast in the mold cavity, forming a runner in the mold leading to that part of the mold cavity whereat the disclosed part of the carrier is positioned, mounting a refractory protecting member in the mold cavity at the end of the runner in position to prevent molten metal from said runner flowing directly into engagement with said carrier, and thereafter pouring molten metal through said runner and past the refractory member and into the mold cavity about the disclosed part of the carrier.

2. The method of casting a working face on the carrier of a section of a sectional braking element and which carrier includes at least one opening that is to be kept free of cast metal and which method comprises forming a mold cavity in a mold in such a way that the part of said carrier on which such a facing is not to be cast may be engaged by adjacent portions of the mold, mounting the carrier in the mold with aforesaid part thereof engaged by said adjacent portions of the mold to thereby support and disclose the part of the carrier on which the facing is to be cast in the mold cavity, forming a runner in the mold leading to that part of the mold cavity whereat the disclosed part of the carrier is positioned, mounting a refractory protecting member in the mold cavity at the end of the runner in position to prevent molten metal from said runner flowing directly into engagement with said carrier, filling any opening in said carrier that is to be kept free of cast metal with refractory metal, and thereafter pouring molten metal through said runner and past the refractory member and into the mold cavity about the disclosed part of the carrier.

3. The method of casting a working face in an interlocked relation on the carrier of a sectional braking element which comprises forming a mold cavity in a mold in such a way that the part of said carrier on which said facing is not to be cast may be engaged by adjacent portions of the mold, mounting the carrier in the mold with the aforesaid part thereof engaged by said adjacent portions of the mold to thereby support and disclose the part of the carrier on which the facing is to be cast in the mold cavity, forming a runner in the mold leading to that part of the mold cavity whereat the disclosed part of the carrier is positioned, mounting a refractory protecting member in the mold cavity within the end of the runner in a position abutting the adjacent surface of the carrier to thereby prevent molten metal from said runner flowing directly into engagement with said carrier, and thereafter pouring molten metal through said runner and past the refractory member and into the mold about the disclosed part of the carrier.

4. The method of casting a working face on the carrier of a section of a sectional braking element and which carrier includes at least one opening that is to be kept free of cast metal and which method comprises forming a mold cavity in a mold in such a way that the part of said carrier on which such a facing is not to be cast may be engaged by adjacent portions of the mold, mounting the carrier in the mold with aforesaid part thereof engaged by said adjacent portions of the mold to thereby support and disclose the part of the carrier on which the facing is to be cast in the mold cavity, forming a runner in the mold leading to that part of the mold cavity whereat the disclosed part of the carrier is positioned, mounting a refractory protecting member within the runner at the end thereof so as to abut the adjacent edge of said carrier and thereby prevent molten metal from said runner flowing directly into engagement with said carrier, filling any opening in said carrier that is to be kept free of cast metal with refractory metal, and thereafter pouring molten metal through said runner and past the refractory member and into the mold cavity about the disclosed part of the carrier.

ROSSER L. WILSON.